No. 746,123. PATENTED DEC. 8, 1903.
F. E. MOREHOUSE.
WIRE STRETCHER AND LIFTING JACK.
APPLICATION FILED FEB. 5, 1903.
NO MODEL.
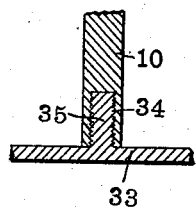
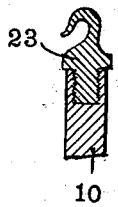
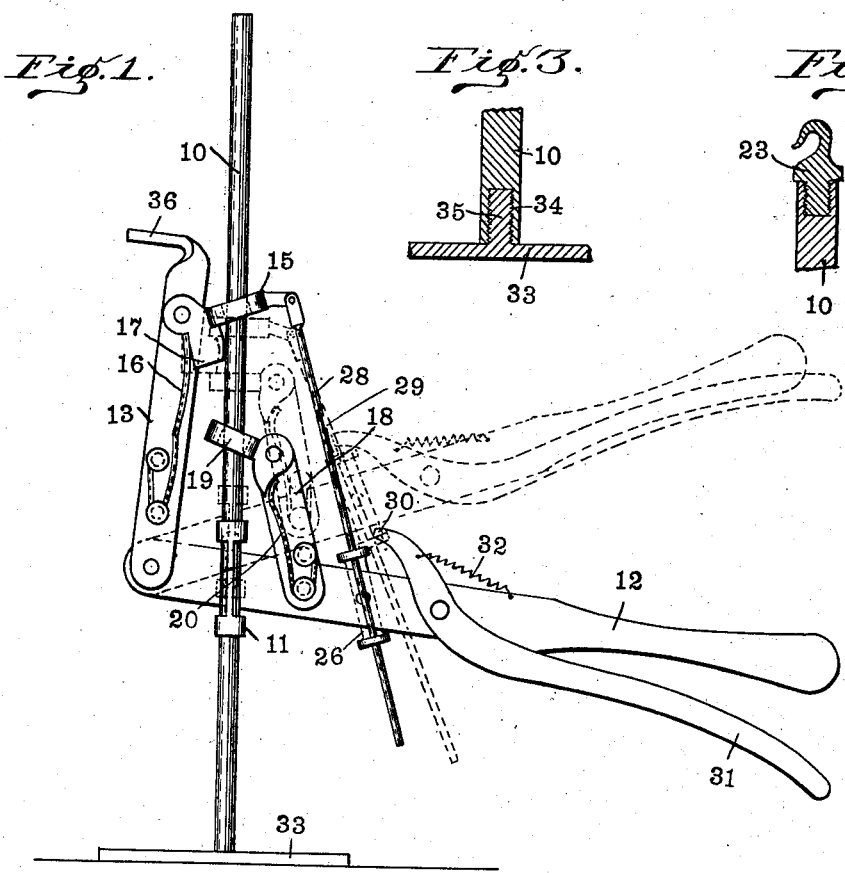
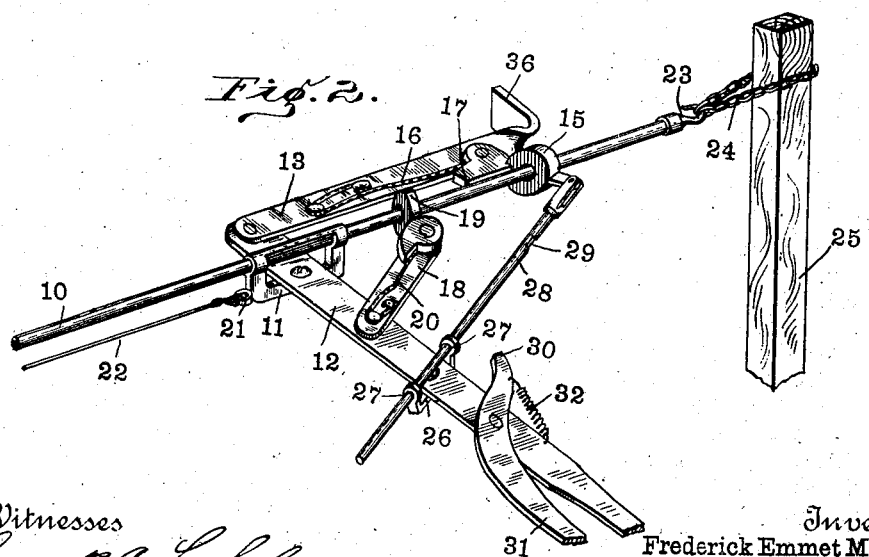
Witnesses
Inventor
Frederick Emmet Morehouse
By
Bradford & Hood
Attorneys No. 746,123. Patented December 8, 1903.

UNITED STATES PATENT OFFICE.

FREDRICK EMMET MOREHOUSE, OF LAFAYETTE, INDIANA.

WIRE-STRETCHER AND LIFTING-JACK.

SPECIFICATION forming part of Letters Patent No. 746,123, dated December 8, 1903.

Application filed February 5, 1903. Serial No. 142,068. (No model.)

*To all whom it may concern:*

Be it known that I, FREDRICK EMMET MOREHOUSE, a citizen of the United States, residing at Lafayette, in the county of Tippecanoe and State of Indiana, have invented certain new and useful Improvements in a Combined Wire-Stretcher and Lifting-Jack, of which the following is a specification.

The object of my invention is to produce a single tool for use on farms, which tool may be used either as a wire-stretcher or as a lifting-jack, my invention relating particularly to means by which the device may be readily returned to normal position.

The accompanying drawings illustrate my invention.

Figure 1 is a side elevation showing the device in condition to be used as a wagon-jack. Fig. 2 is a perspective view showing the device in use as a wire-stretcher, and Figs. 3 and 4 are details of opposite ends of the main rod.

In the drawings, 10 indicates a main rod, upon which is sleeved a yoke 11, to which is pivoted an operating-lever 12. Pivoted to lever 12, upon one side of the fulcrum thereof, is a link 13. Pivoted to the free end of link 13 is a gripping-eye 15, through which rod 10 passes, which eye is normally held obliquely to rod 10 by means of a suitable spring 16, carried by link 13. Eye 15 is provided with tail 17, the purpose of which will appear. Pivoted to operating-lever 12 in opposition to link 13 is a link 18, to the free end of which is pivoted a gripping-eye 19, through which rod 10 is passed, and which is held obliquely with relation to rod 10 and in opposition to eye 15 by means of a suitable spring 20. Yoke 11 is provided with an eye 21, to which a wire 22 to be stretched may be attached. Thus far the parts described are old and well known, and I lay no claim thereto. Detachably secured to one end of said rod 10 is a hook 23, adapted to engage a chain 24, which may be passed around a fence-post 25. Pivoted to lever 12 upon the same side of the fulcrum thereof as link 18 is a yoke 26, having eyes 27, through which is passed a rod 28, pivotally connected at its upper end to eye 15. Rod 28 is provided near its upper end with a notch 29, adapted to receive the inner end 30 of a detent-lever 31, pivoted to the operating-lever 12 and normally held in the position shown in full lines in Fig. 1 by a spring 32.

Detachably secured to the lower end of the main rod 10 is a foot-piece 33, and in order that the connecting means may not be readily marred when the foot-piece is detached the connection is preferably such as is shown in Fig. 3, in which a threaded socket 34 is formed in the end of rod 10 and adapted to receive a threaded stud 35, carried by foot-piece 33. For the same reason a similar construction is used in the connection between rod 10 and hook 23, as clearly shown in Fig. 4. Formed upon the upper or free end of link 13 is a step 36, adapted to be placed beneath anything, such as a wagon-axle, to be lifted.

In operation as a lifting-jack, hook 23 is preferably removed and foot-piece 33 is attached, and in order to bring the parts to lowest position lever 12 is swung about its pivotal connection with link 13, sleeve 11 sliding upward on rod 10, as indicated in dotted lines in Fig. 1, and link 13 being held in vertical position by reason of the gripping action of eye 15. When the parts have been thrown to the position shown in dotted lines in Fig. 1, detent-lever 31 may be swung in opposition to spring 32, so that its end 30 will enter notch 29 of rod 28 and draw rod 28 downward, so as to swing eye 15 square across rod 10 and bring tail 17 of said eye into engagement with eye 19, so as to swing said eye 19 square across rod 10, whereupon the device as a whole may be readily slipped up and down rod 10 and step 36 brought to proper position to pass beneath the article to be raised. The operator then releases detent 31 and by a pumping action upon rod 12 causes the link 13 to climb rod 10 in the usual well-known manner. The operation as a wire-stretcher is exactly the same, except that foot-piece 33 is removed and hook 23 attached to the upper end of rod 10. In either case it will be readily seen that the operating parts may be quickly and easily returned to normal position by use of the detent-lever 31, whereas in prior constructions it was necessary for the operator to exert a sufficient pressure upon eye 15 by means of his fingers.

I claim as my invention—

1. In an apparatus of the class described, the combination, with the main rod, of a yoke sleeved thereon, a lever pivoted to said yoke, a pair of links pivoted to said lever, a pair of gripping-eyes, adapted to receive the main rod, pivoted one upon each of said links, means for normally holding said eyes obliquely with relation to the main rod, and means for engaging said eyes and swinging the same from their normal position so as to prevent their engagement with the rod.

2. In an apparatus of the class described, the combination, with the main rod, of a yoke sleeved thereon, a lever pivoted to said yoke, a pair of links pivoted to said lever, a pair of gripping-eyes, adapted to receive the main rod, pivoted one upon each of said links, means for normally holding said eyes obliquely with relation to the main rod, a second yoke pivoted to the operating-lever, a rod threaded through said yoke said rod being pivotally connected to one of the eyes, a detent-lever mounted upon the operating-lever and adapted to engage said rod and move it to swing the eye to which it is attached, and means carried by said eye for engaging the other eye, for the purpose set forth.

3. In an apparatus of the class described, the combination, with the main rod, of a yoke sleeved thereon, a lever pivoted to said yoke, a pair of links pivoted to said lever, a lifting-step carried by one of said links, a pair of gripping-eyes, adapted to receive the main rod, pivoted one upon each of said links, means for normally holding said eyes obliquely with relation to the main rod, and means for engaging said eyes and swinging the same from their normal position so as to prevent their engagement with the rod.

4. In an apparatus of the class described, the combination, with the main rod, of a yoke sleeved thereon, a lever pivoted to said yoke, a pair of links pivoted to said lever, a lifting-step carried by one of said links, a pair of gripping-eyes, adapted to receive the main rod, pivoted one upon each of said links, means for normally holding said eyes obliquely with relation to the main rod, a second yoke pivoted to the operating-lever, a rod threaded through said yoke said rod being pivotally connected to one of the eyes, a detent-lever mounted upon the operating-lever and adapted to engage said rod and move it to swing the eye to which it is attached, and means carried by said eye for engaging the other eye, for the purpose set forth.

In witness whereof I have hereunto set my hand and seal, at Lafayette, Indiana, this 3d day of February, A. D. 1903.

FREDRICK EMMET MOREHOUSE. [L. S.]

Witnesses:
 B. W. ROYDON,
 ANNA LANMERT.